(12) United States Patent
Schweid et al.

(10) Patent No.: US 11,872,768 B2
(45) Date of Patent: Jan. 16, 2024

(54) THREE DIMENSIONAL ENHANCEMENT OF TWO DIMENSIONAL PRINTED IMAGES

(71) Applicant: Xerox Corporation, Norwalk, CT (US)

(72) Inventors: Stuart A. Schweid, Pittsford, NY (US); Martin L. Frachioni, Rochester, NY (US); David A. Vankouwenberg, Avon, NY (US); Christopher Mieney, Lima, NY (US)

(73) Assignee: Xerox Corporation, Norwalk, CT (US)

( * ) Notice: Subject to any disclaimer, the term of this patent is extended or adjusted under 35 U.S.C. 154(b) by 216 days.

(21) Appl. No.: 17/477,371

(22) Filed: Sep. 16, 2021

(65) Prior Publication Data

US 2023/0079723 A1    Mar. 16, 2023

(51) Int. Cl.
*B29C 64/393* (2017.01)
*B29C 64/165* (2017.01)
*B33Y 50/02* (2015.01)
*B33Y 30/00* (2015.01)
*B33Y 10/00* (2015.01)

(52) U.S. Cl.
CPC .......... *B29C 64/393* (2017.08); *B29C 64/165* (2017.08); *B33Y 50/02* (2014.12); *B33Y 10/00* (2014.12); *B33Y 30/00* (2014.12)

(58) Field of Classification Search
CPC .................................................. B29C 64/393
See application file for complete search history.

(56) References Cited

U.S. PATENT DOCUMENTS

| 9,050,820 | B2 | 6/2015 | Soleimani-Gorgani | |
|---|---|---|---|---|
| 9,213,255 | B1 | 12/2015 | Zaretsky et al. | |
| 9,400,910 | B2* | 7/2016 | Kumar | B29C 64/393 |
| 2010/0039427 | A1* | 2/2010 | Yun | G06T 15/02 |
| | | | | 345/419 |
| 2010/0055423 | A1* | 3/2010 | Chretien | C09D 11/101 |
| | | | | 428/209 |
| 2016/0167297 | A1* | 6/2016 | Donaldson | B29C 64/112 |
| | | | | 264/129 |
| 2020/0134269 | A1* | 4/2020 | Berger | B22F 10/39 |
| 2021/0146632 | A1* | 5/2021 | Blain | B29C 64/245 |
| 2022/0189101 | A1* | 6/2022 | Ulichney | G06K 19/06028 |

FOREIGN PATENT DOCUMENTS

KR    20190067073 A  *  6/2019

* cited by examiner

*Primary Examiner* — Suresh Suryawanshi (57) ABSTRACT

An MFD is disclosed. For example, the MFD includes a color printhead to dispense color printing fluid, an enhancement printhead to dispense a three-dimensional (3D) print material, a processor and a non-transitory computer-readable medium storing a plurality of instructions. The instructions when executed by the processor cause the processor to perform operations that include printing a two-dimensional (2D) image on a substrate and printing a 3D object on the 2D image printed on the substrate such that colors of the 2D image provide a desired color for a desired portion of the 3D object.

20 Claims, 5 Drawing Sheets

THREE DIMENSIONAL ENHANCEMENT OF TWO DIMENSIONAL PRINTED IMAGES

The present disclosure relates generally to printing documents, and relates more particularly to a method and apparatus to add three-dimensional enhancements to two dimensional printed images.

BACKGROUND

Printing devices can be used to print images onto a substrate. Images can be printed by dispensing printing fluid onto desired portions of the substrate. A processor may control movement of a printhead and the amount of printing fluid that is dispensed on the selected portions of the substrate. The printing fluid may include various colors to print the image.

Some technologies have tried to add texture to printed images. However, these previous technologies use methods that make it difficult to control the precise geometry and height of the added texture.

In addition, traditional three-dimensional printing uses a print bed with different colored materials to print objects having different colors. It can be expensive to store the different colored materials and time consuming to constantly switch back and forth between different colored materials when printing an object.

SUMMARY

According to aspects illustrated herein, there are provided an MFD and a method for automatically enhancing a printed document. One disclosed feature of the embodiments is an MFD that comprises a color printhead to dispense color printing fluid, an enhancement printhead to dispense a three-dimensional (3D) print material, a processor and a non-transitory computer-readable medium storing a plurality of instructions. The instructions when executed by the processor cause the processor to perform operations that include printing a two-dimensional (2D) image on a substrate and printing a 3D object on the 2D image printed on the substrate such that colors of the 2D image provide a desired color for a desired portion of the 3D object.

Another disclosed feature is a method for automatically enhancing a printed document. The method executed by a processor of the MFD comprises determining a color for different portions of a three-dimensional (3D) object to be printed, controlling a color printhead to print the color for the different portions of the 3D object in a two-dimensional (2D) image on a substrate, and controlling an enhancement printhead to dispense a 3D print material on the 2D image, such that the color of the 2D image shows through the desired portions of the 3D object.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to add three-dimensional enhancements to two dimensional printed images. As discussed above, some technologies have tried to add texture to printed images. However, these previous technologies use methods that make it difficult to control the precise geometry and height of the added texture.

In addition, traditional three-dimensional printing uses a print bed with different colored materials to print objects having different colors. It can be expensive to store the different colored materials and time consuming to constantly switch back and forth between different colored materials when printing an object.

The present disclosure provides the ability to add a three-dimensional (3D) enhancement to two-dimensional (2D) printed images. In one embodiment, a single clear material may be used to add the 3D enhancement. The color of the 2D printed image may be used to provide the color of the 3D printed portion. Thus, a single color 3D print material may be used and dispensed to lower costs and improve efficiency of some colored 3D print jobs.

In one embodiment, the clear 3D print material may include some tinting or materials that allow a height reader to read the height of the 3D printed portions. Thus, the 3D enhancement may be used to provide an added level of security to 2D printed images.

Figure 1:
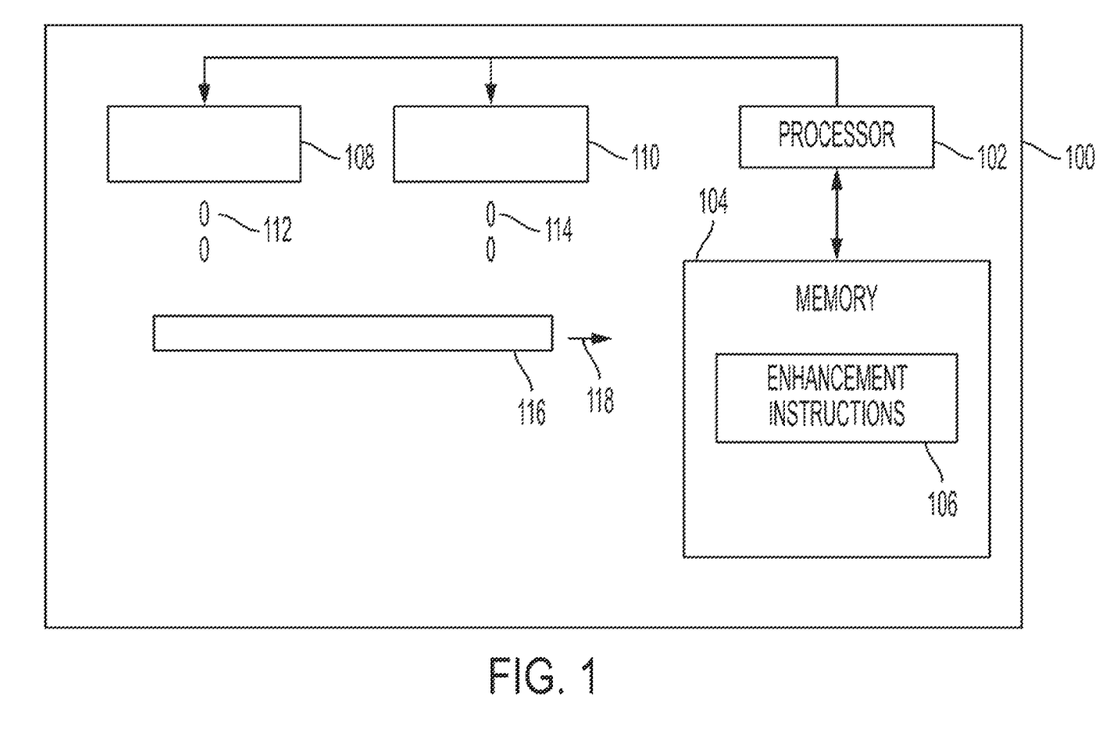
FIG. 1 illustrates a block diagram of an example MFD that includes a 3D enhancement printhead in accordance with the present disclosure.

FIG. 1 illustrates an example multi-function device (MFD) 100 of the present disclosure. In one embodiment, the MFD 100 may include a processor 102, a memory 104, a color printhead 108, and an enhancement printhead 110. The processor 102 may be communicatively coupled to the memory 104, the color printhead 106, and the enhancement printhead 110, In one embodiment, the memory 104 may be any type of non-transitory computer readable medium. For example, the memory 104 may be a hard disk drive, a solid state drive, a random access memory (RAM), a read-only memory (ROM), and the like.

The memory 104 may store various information. For example, the memory 104 may store enhancement instructions 106 that may be executed by the processor 102 to perform the functions described herein. In one embodiment, the enhancement instructions 106 may determine the colors associated with each portion of the 3D object or enhancement that is to be printed onto a substrate 116. The enhancement instructions 106 may arrange the colors such that each portion of the 3D object will appear to have the desired color. The enhancement instructions 106 may then cause the processor 102 to control the color printhead 108 to dispense color printing fluid 112 on the substrate 116 in accordance with the arrangement that was determined to print a two-dimensional (2D) image. The enhancement instructions 106 may also cause the processor 102 to control the enhancement printhead 110 to dispense 3D print material 114 over the printed 2D image such that the final 3D printed object is aligned with the desired colors of the printed 2D image. Examples of the enhancement instructions are discussed in further details below.

In one embodiment, the processor 102 may control operation of the color printhead 106 and the enhancement printhead 110. The processor 102 may control the color printhead 108 to dispense the color printing fluid 112 onto the substrate 116 to print the 2D image. In one embodiment, the substrate 116 may be paper. The substrate 116 may move in a direction as shown by an arrow 118 to move below the color printhead 108 and then downstream to the enhancement printhead 110.

As noted above, the 2D image may be a printed image. For example, the printed image may be a machine readable code (e.g., a bar code, a quick response (QR) code, and the like), a pattern of braille dots, a color image or picture, and the like. The 2D image may be a plurality of different colors or may be a single color (e.g., black only for the machine readable code or pattern of braille dots).

The color printhead 108 may include several different colors. For example, the color printhead 108 may be a cyan, yellow, magenta, and black (CYMK) printhead. The processor 102 may control how much of each color is dispensed at a desired location on the substrate 116 to generate a particular color. The process may be repeated for various locations on the substrate 116 to print a desired 2D image. Although the examples described herein illustrate an example of a color printhead 108 that uses color printing fluid 112, it should be noted that a laser printer with color toner may also be used to print the 2D image.

The processor 102 may also control the enhancement printhead 110 to dispense a desired amount of the 3D print material 114 onto desired locations on the substrate 116. The 3D print material 114 may be a clear or mostly clear material. The 3D print material 114 may be a clear or mostly clear plastic that can be extruded or dispensed onto desired locations over the 2D printed image. Examples of the 3D print material 114 may include acrylonitrile butadiene styrene (ABS), polylactic acid (PLA), acrylonitrile styrene acrylate (ASA), polyethylene terephthalate glycol (PETG), nylon, polycarbonate, and some metals (e.g., aluminum).

As noted above, a 3D print material 114 may be stored and dispensed to reduce printing costs. The color printing fluid 112 may be much cheaper than different colored 3D print materials. Thus, the color printing fluid 112 may provide the desired color for the 3D printed object.

As noted above, a design may have different colors for different portions of the 3D printed object. A pattern of the different colors may be printed in a 2D printed image on the substrate 116. The enhancement printhead 110 may then dispense the 3D print material 114 to build the 3D object over the 2D printed image. The 3D object may be printed in alignment with the 2D printed image such that the colors of the 2D printed image provide the desired color for the different portions of the 3D object.

In some embodiments, the 3D print material 114 may be semi-clear plastic. For example, the 3D print material 114 may include some particles or a slight hue such that the height of the 3D object can be measured by a height reader. Thus, a 3D object can add additional dimensions and more information to machine readable codes (e.g., bar codes and QR codes).

In one embodiment, the MFD 100 may operate by printing the image on the substrate 116 with the color printhead 108 on a first pass. The MFD 100 may then dispense the 3D printing material 114 on the determined locations of the 2D printed image on a second pass. The 3D printing material 114 may be dispensed over several passes to build different heights or shapes of the final 3D printed object over the 2D printed image.

It should be noted that the 3D object that is printed on the substrate is relatively small. For example, the height of the 3D object that is printed on the substrate 116 may be less than 5 millimeters (mm) or approximately 2-5 mm. Thus, the 3D object that is printed may still pass through the various paper paths of MFD 100.

In one embodiment, the color printhead 108 may be in a separate compartment from the enhancement printhead 110. For example, the substrate 116 may travel through a paper path within the compartment of the color printhead 108 to receive the printed 2D image. The substrate 116 may then be passed to a separate compartment that includes the enhancement printhead 110. The 3D object may be printed over the printed 2D image and then passed to an output tray. Thus, the paper paths of the compartment that includes the enhancement printhead 110 may be modified to provide enough clearance and minimal rolling of the substrate 116 with the 3D object that is printed.

It should be noted that the MFD 100 has been simplified for ease of explanation. The MFD 100 may include additional components that are not shown. For example, the MFD 100 may include a display to present a graphical user interface (GUI), an optical scanner to perform scan and copy function, a network interface to establish a wired or wireless network connection to the Internet or transmit emails, and the like. The MFD 100 may include paper trays, a digital front end (DFE) to convert print job requests into a printer description language (PDL), and the like.

In one embodiment, the GUI may provide a preview that shows an isometric view of the 3D printed object on the substrate 116 to allow the user to see how the colors would appear on the different portions of the 3D printed object. The GUI may allow users to change colors of different portions of the 3D printed object via changing the colors of the 2D printed image. The GUI may provide other user selectable options, such as a number of copies, paper type, and the like.

Figure 2:
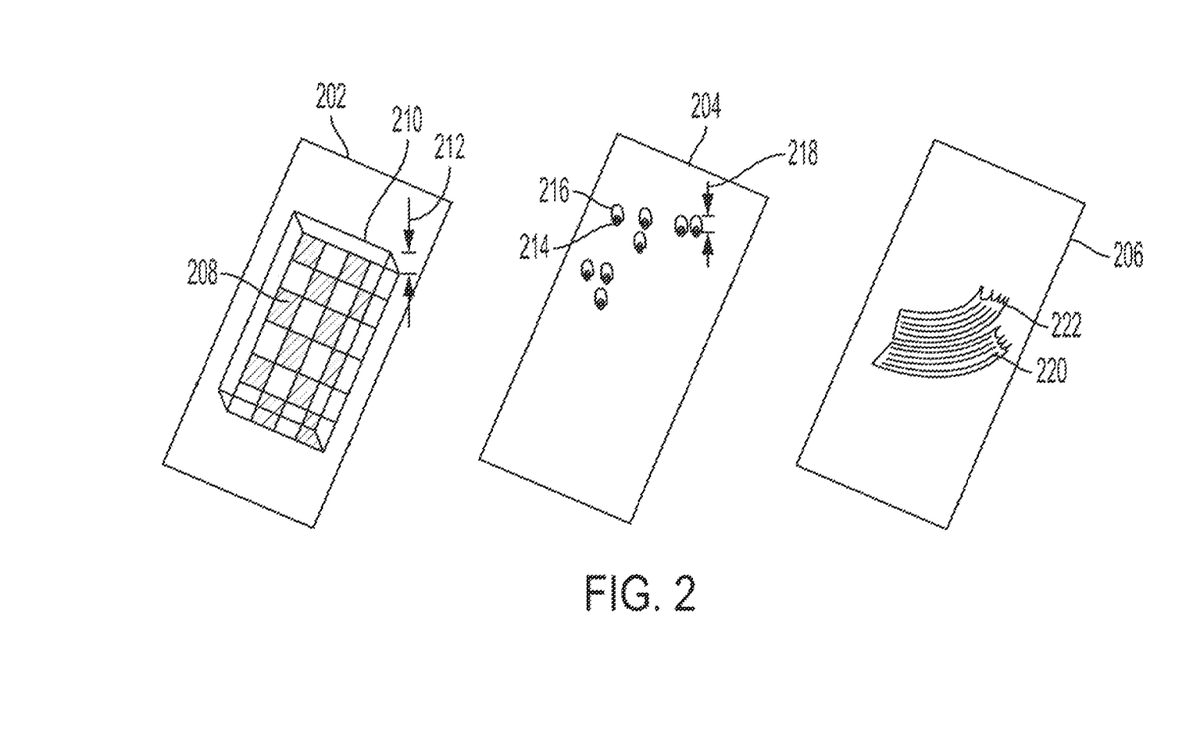
FIG. 2 illustrates example 2D printed images with a 3D enhancement of the present disclosure.

FIG. 2 illustrates different examples of 2D printed images with 3D enhancements. For instance, example 202 illustrates an example of a machine readable code with a 3D enhancement. The example 202 includes a 2D image 208 of a quick response (QR) code. A 3D enhancement 210 may be printed over the 2D image 208. The 3D enhancement 210 may have a height 212 of several millimeters, as described above (e.g., about 2-5 mm). Although the 3D enhancement 210 is shown to have a single height 212, it should be noted that the 3D enhancement 210 may have different heights at different portions. An example is illustrated in the process flow diagram illustrated in FIG. 3 and discussed below.

An example 204 illustrates an example of a braille pattern. For example, the dots 214 can be printed in a desired pattern for the various braille letters, words, text, and the like. The 3D enhancement 216 may be printed over each dot 214 that is printed. The 3D enhancement 216 may have a height 218 that allows a reader to feel the braille text.

An example 206 illustrates an example of an image 220 that includes the 3D enhancement 222. The 3D enhancement 222 may be faux brushstrokes. For example, the 3D enhancement 222 may allow the image 220 to appear and "feel" as if the image 220 was painted. The 3D enhancement 222 may provide texture to simulate an oil painting.

Although FIG. 2 illustrates a few examples 202, 204, and 206 of 2D images with 3D enhancements, it should be noted that the 3D enhancements may be added to other images that are not illustrated in FIG. 2. In other words, the examples 202, 204, and 206 illustrated in FIG. 2 should not be considered to be limiting. For example, the 3D enhancements may provide a seal or security mark over a printed image rather than having the seal "pressed" or "embossed".

Figure 3:
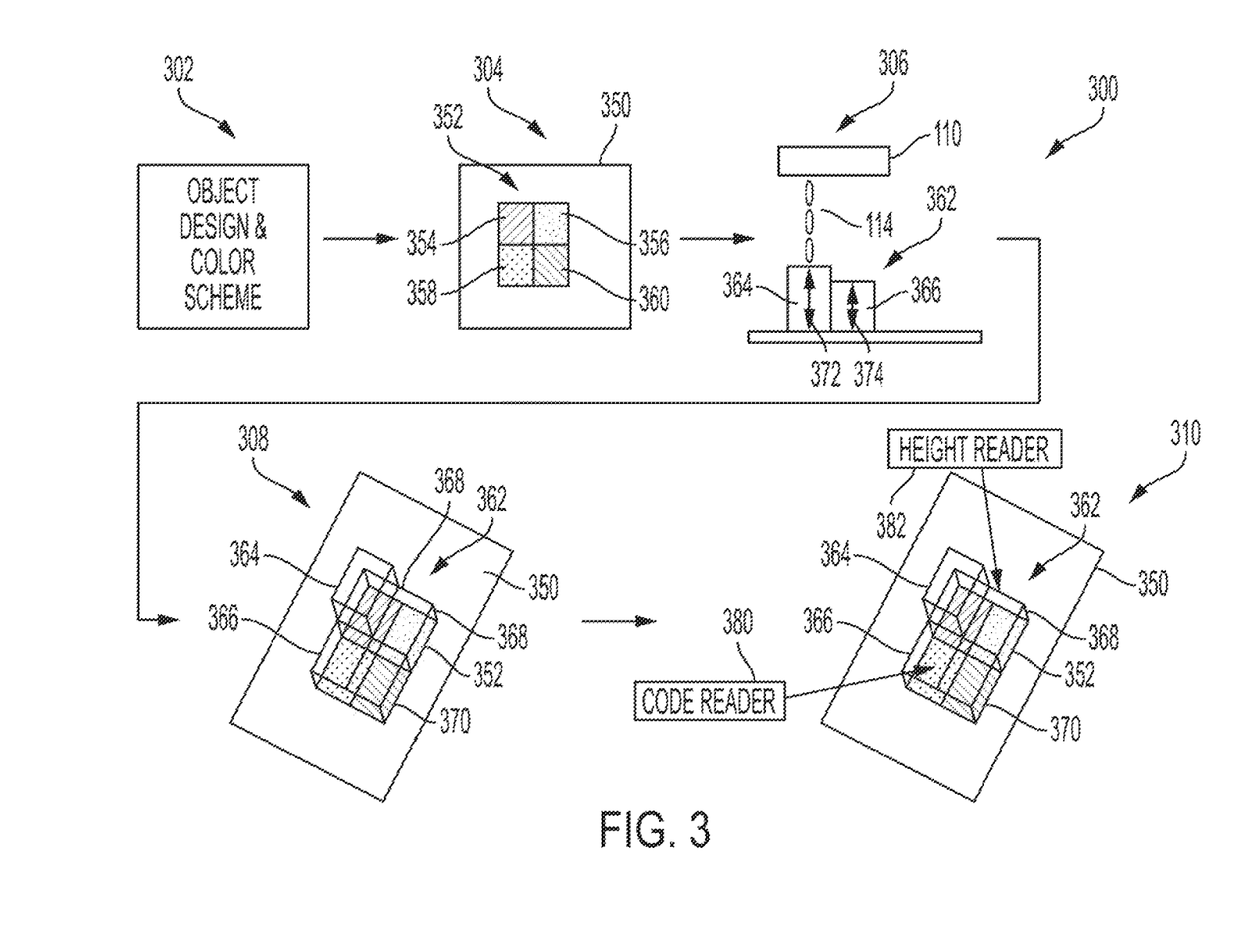
FIG. 3 illustrates a process flow diagram of generating a 2D printed image with a 3D enhancement of the present disclosure.

FIG. 3 illustrates an example process flow 300 of a process of generating a 2D printed image with a 3D enhancement of the present disclosure. The example illustrated in FIG. 3 illustrates a machine readable code (e.g., the example 202 in FIG. 2). However, it should be noted that the process 300 can be used to print the other types of 2D images as well (e.g., examples 204 and 206 in FIG. 2 and other images).

At block 302, the process 300 determines the object design and color scheme. The object design may determine what the 3D enhancement or printed object will look like. The object design may determine the shape and/or height of various portions of the 3D enhancement. In a simple example, the object design may include four different rectangular sections having different heights.

In one embodiment, the color scheme may determine a color for each portion of the 3D object. For example, each different rectangular section may have a different color. Thus, the 2D image may include four rectangular sections with a desired color for the four different rectangular sections that will be printed as the 3D enhancement.

It should be noted that each color may not necessarily be limited to a distinct section of the 3D enhancement. For example, a rectangular section may include different colors or an image that is to appear below a particular section. In some examples, a single color may be used for the entire 3D enhancement.

At block 304, the color printhead 108 may be used to dispense the color printing fluid 112 to print a 2D image 352 on a substrate 350. In an example, the 2D image 352 includes four different sections 354, 356, 358, and 360 that have different colors that correspond to the desired colors of the four different rectangular sections of the 3D enhancement that is to be printed.

At block 306, the enhancement printhead 110 may be used to dispense the 3D print material 114 onto the desired portions of the 2D image 352. The outline of the 3D enhancement may align with the boundary or outline of the 2D printed image. In one embodiment, the 3D print material 114 may be dispensed to build the desired portions 364, 366, 368, and 370 (368 and 370 shown in block 308) of the 3D enhancement 362.

In an example, each portion 364, 366, 368, and 370 may be printed to have a different height. For example, the portion 364 may have a height 372 and the portion 366 may have a height 374.

Block 308 illustrates an example finished 2D printed image 352 with the 3D enhancement 362. As noted above, each portion 364, 366, 368, and 370 may be printed over the corresponding color of the 2D image. For example, the portion 364 may be printed over the section 354, the portion 366 may be printed over the section 358, the portion 368 may be printed over the section 356, and the portion 370 may be printed over the section 360. Thus, the portion 364 appears to have a color of the ink or toner used to print the section 354, the portion 366 appears to have a color of the ink or toner used to print the section 358, the portion 368 appears to have a color of the ink or toner used to print section 356, and the portion 370 appears to have a color of the ink or toner used to print section 370.

In one embodiment, an optional block 310 may be performed. In one embodiment, the 2D image 352 may be a machine readable code. The 3D enhancement 362 may provide an additional layer of data via the pattern of the different heights of the portions 364, 366, 368, and 370. In optional block 310, a code reader 380 may be used to read the machine readable code in the 2D image 352, and a height reader 382 may be used to read the heights of the different portions 364, 366, 368, and 370.

In one embodiment, the code reader 380 may be a bar code reader, a QR code reader, and the like. The code reader 380 may use a laser light to scan the 2D printed image 352.

In one embodiment, the height reader 382 may use a laser light to measure a distance to the top surface of each portion 364, 366, 368, and 370 of the 3D enhancement. Based on a known distance to the substrate, the height reader 382 may calculate a height of each portion 364, 366, 368, and 370. Different patterns of different heights of each portion 364, 366, 368, and 370 may provide another layer of data for security or information. The combination of the code read by the code reader 380 and the pattern of different heights of the portions 364, 366, 368, and 370 read by the height reader 382 may provide data that can be used for security or labeling.

Thus, the 3D enhancement 362 may increase information density for codes, such as a QR code, by up to 60%. This may allow machine readable codes to be printed smaller with the 3D enhancement 362. In addition, the 3D enhancement 362 may provide embedded information. For example, the QR code may include general ticket information for a ticket, and the pattern of heights 364, 366, 368, and 370 of the 3D enhancement 362 may provide account information of the ticket holder.

In one embodiment, the 3D print material 114 may include a mixture of clear plastic and some particles or flakes to provide some refraction. In another embodiment, the 3D print material 114 may include a slight hue or tint. In other words, the 3D print material 114 may be a semi-clear plastic to allow the height reader 382 to measure the heights of the portions 364, 366, 368, and 370 of the 3D enhancement 362. For example, if the 3D print material 114 was completely clear, the laser emitted by the height reader 382 might pass right through the 3D enhancement 362 and be unable to measure the heights of the portions 364, 366, 368, and 370.

Thus, the present disclosure provides an apparatus and method that provides 3D enhancements to 2D printed images. The methods of the present disclosure may allow color to be added to some 3D printed objects or images using a single 3D print material (e.g., a clear or semi-clear material). The color may be provided by the ink or toner used to print the underlying 2D image.

In addition, the 3D enhancement may provide additional benefits for machine readable codes or security marks. For example, the 3D enhancement may increase information density for the machine readable codes or make unique security marks that are difficult to duplicate.

Figure 4:
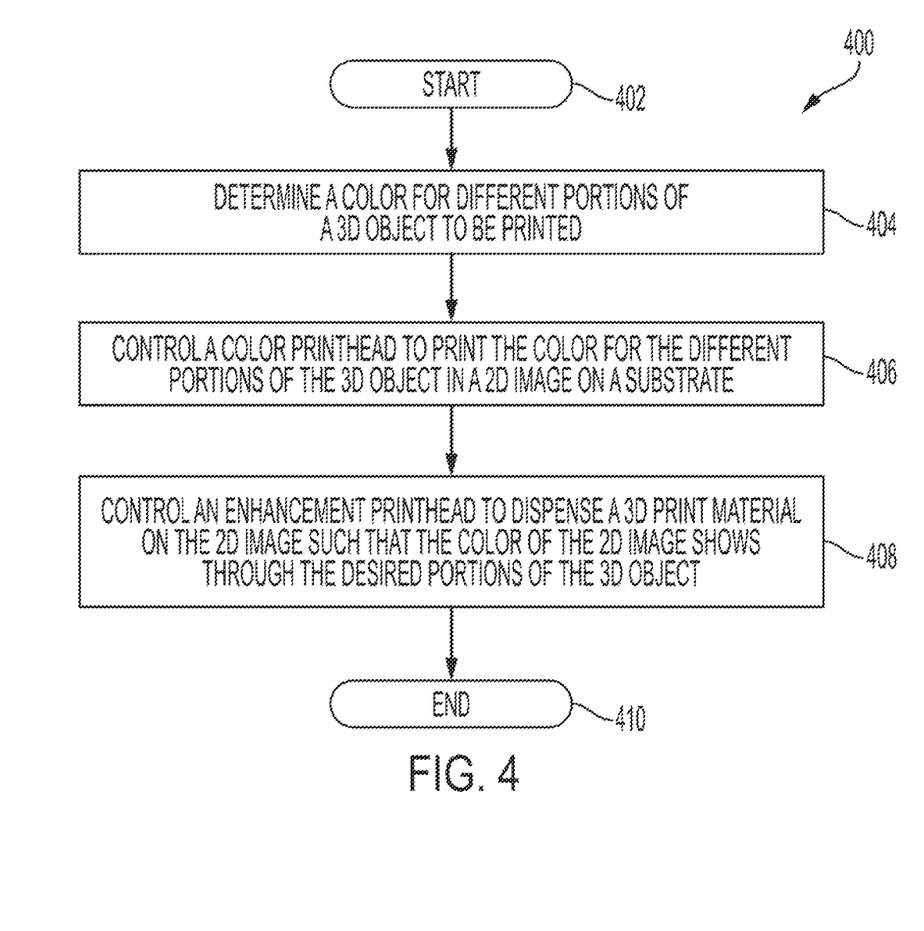
FIG. 4 illustrates a flow chart for a method of adding a 3D enhancement to a 2D printed image of the present disclosure.

FIG. 4 illustrates a flow chart of an example method 400 for adding a 3D enhancement to a 2D printed image of the present disclosure. In one embodiment, the method 400 may be performed by the MFD 100 or by an apparatus such as the apparatus 500 illustrated in FIG. 5 and discussed below.

In one embodiment, the method 400 begins at block 402. At block 404, the method 400 determines a color for different portions of a three-dimensional (3D) object to be printed. For example, the 3D object may be an enhancement to a 2D image that is printed. A user may select different portions of the 3D object to have different colors, or may indicate that all portions of the 3D object are to be printed to have the same color.

The color for the 3D printed object may be provided by the color of the 2D printed image below the 3D printed object. For example, the color may be viewed from above the 3D printed object or looking down at the substrate that the 2D image and the 3D printed object is printed on.

The 3D enhancement may be a security mark code having different heights to be added over a machine readable code (e.g., a QR code or bar code), a raised seal, a machine readable code, a braille pattern, a faux brush stroke to simulate an oil painting or other types of artwork, and the like. The 3D object may be printed to have a height in the range of 2-5 millimeters. Thus, the 3D object is to provide a texture and/or enhancement to the printed image rather than being a stand-alone object.

At block 406, the method 400 controls a color printhead to print the color for the different portions of the 3D object in a 2D image on a substrate. For example, the 2D image may include various shapes and/or sections of one or more colors that correspond to shapes and/or sections of the 3D object that is to be printed. For example, a section of the 2D image may be a circle with a red color to provide red color to a spherical or circular portion of the 3D object. Another section of the 2D image may have a pattern of different colored stripes in a rectangular section to provide the color and pattern of stripes for a rectangular portion of the 3D object, and so forth. The color may be printed with printing fluid or toner.

At block 408, the method 400 controls an enhancement printhead to dispense a 3D print material on the 2D image, such that the color of the 2D image shows through the desired portions of the 3D object. The 3D print material may be a clear or semi-clear plastic that can be extruded or dispensed onto the 2D printed image. The 3D object may be printed to align with the 2D printed image such that the colors of the 2D printed image can provide the selected color for the different portions of the 3D object. The colors can be viewed through the clear or semi-clear 3D print material to make it appear as though the 3D object is colored with the selected colors for the various portions of the 3D object.

In one embodiment, the 3D print material may be semi-clear as noted above. As a result, the 3D object can be read by a height reader to measure the different heights of the 3D object. The pattern of different heights of the 3D printed object may provide an additional layer of security and/or information. At block 410, the method 400 ends.

Figure 5:
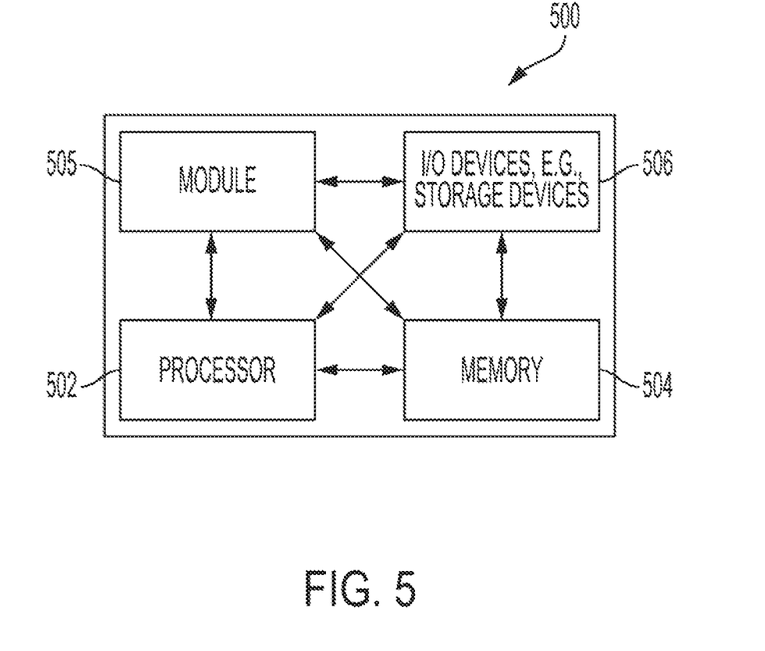
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for adding a 3D enhancement to a 2D printed image, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for adding a 3D enhancement to a 2D printed image (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for adding a 3D enhancement to a 2D printed image (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:
1. A multi-function device (MFD), comprising:
   a color printhead to dispense color printing fluid;
   an enhancement printhead to dispense a three-dimensional (3D) print material;
   a processor; and
   a non-transitory computer-readable medium storing a plurality of instructions, which when executed by the processor, causes the processor to perform operations comprising:
      determining colors associated with each portion of a 3D object;
      determining an arrangement of the colors for a two-dimensional (2D) image based on the colors associated with each portion of the 3D object that is determined;
      printing the 2D image on a substrate in accordance with the arrangement, wherein the substrate comprises paper; and
      printing the 3D object on top of the 2D image printed on the substrate such that colors of the 2D image provide a desired color for each portion of the 3D object.

2. The MFD of claim 1, wherein the 3D print material comprises a clear plastic.

3. The MFD of claim 1, wherein the 3D print material comprises a semi-clear plastic.

4. The MFD of claim 1, wherein the desired color of each portion of the 3D object determines a location where the 3D print material is dispensed over each color of the 2D image that is printed on the substrate.

5. The MFD of claim 1, wherein the 3D object comprises a security mark code having a plurality of different heights.

6. The MFD of claim 5, wherein the 2D image comprises a machine readable code located below the 3D object that is printed.

7. The MFD of claim 6, wherein the machine readable code comprises a bar code or a quick response code.

8. The MFD of claim 1, wherein the 3D object comprises a braille pattern.

9. The MFD of claim 1, wherein the 3D object comprises a structure that represents a brushstroke over the 2D image.

10. The MFD of claim 1, wherein a height of the 3D object that is printed on the 2D images is 2-5 millimeters.

11. A method, comprising:
   determining, via a processor, respective colors for different portions of a three-dimensional (3D) object to be printed;
   determining, via the processor, an arrangement of the respective colors in a two-dimensional (2D) image based on the respective colors for the different portions of the 3D object that is determined;
   controlling, via the processor, a color printhead to print the respective colors for the different portions of the 3D object in the 2D image on a substrate in accordance with the arrangement, wherein the substrate comprises paper; and
   controlling, via the processor, an enhancement printhead to dispense a 3D print material on top of the 2D image, such that the respective colors of the 2D image show through the different portions of the 3D object.

12. The method of claim 11, wherein the 3D print material comprises a clear plastic.

13. The method of claim 11, wherein the 3D print material comprises a semi-clear plastic.

14. The method of claim 11, wherein the respective colors of the different portions of the 3D object determine locations where the 3D print material is dispensed over each of the respective colors of the 2D image that is printed on the substrate.

15. The method of claim 11, wherein the 3D object comprises a security mark code having a plurality of different heights.

16. The method of claim 15, wherein the 2D image comprises a machine readable code located below the 3D object that is printed.

17. The method of claim 16, wherein the machine readable code comprises a bar code or a quick response code.

18. The method of claim 11, wherein the 3D object comprises a braille pattern.

19. The method of claim 11, wherein the 3D object comprises a structure that represents a brushstroke over the 2D image.

20. A multi-function device (MFD), comprising:
   a color printhead to dispense color printing fluid;
   an enhancement printhead to dispense a semi-clear print material;
   a processor; and
   a non-transitory computer-readable medium storing a plurality of instructions, which when executed by the processor, causes the processor to perform operations comprising:
      determining colors associated with each portion of a three-dimensional (3D) object;
      determining an arrangement of the colors for a two-dimensional (2D) image based on the colors associated with each portion of the 3D object that is determined;
      printing the 2D image on a substrate in accordance with the arrangement, wherein the substrate comprises paper; and
      printing the 3D object on top of the 2D image printed on the substrate such that colors of the 2D image provide respective desired colors for each portion of the 3D object, wherein the 3D object comprises a security mark having different heights, wherein the semi-clear print material that forms the 3D object can be read by a height measuring device.

* * * * *